(12) United States Patent  (10) Patent No.: US 8,944,913 B2
Joynes et al.  (45) Date of Patent: *Feb. 3, 2015

(54) TABLET COMPUTER WITH GRIP RAIL AND GAME CONTROLLER

(71) Applicant: Wikipad, Inc., Los Angeles, CA (US)

(72) Inventors: Matthew R. Joynes, Agoura Hills, CA (US); James Bower, Windermere, FL (US)

(73) Assignee: Wikipad, Inc., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,588

(22) Filed: Feb. 28, 2013

(65) Prior Publication Data

US 2013/0178286 A1  Jul. 11, 2013

Related U.S. Application Data

(63) Continuation of application No. 13/494,801, filed on Jun. 12, 2012.

(60) Provisional application No. 61/577,709, filed on Dec. 20, 2011.

(51) Int. Cl.
   G06F 13/00 (2006.01)
   G06F 17/00 (2006.01)
   A63F 9/24 (2006.01)
   (Continued)

(52) U.S. Cl.
   CPC . *A63F 13/06* (2013.01); *G06F 1/16* (2013.01); *A63F 13/08* (2013.01); *A63F 2300/1043* (2013.01); *A63F 2300/204* (2013.01)
   USPC ............................... 463/36; 463/37; 710/303

(58) Field of Classification Search
   USPC ..................................... 463/36–38; 312/223.1
   See application file for complete search history.

(56) References Cited

U.S. PATENT DOCUMENTS 5,401,091 A * 3/1995 Landry ...................... 312/223.1
5,936,539 A * 8/1999 Fuchs ............................ 340/3.3
(Continued)

OTHER PUBLICATIONS iGear360, Belkin's Grip 360 + Stand case for the Apple iPad , Dec. 24, 2010, http://www.igear360.com/2010/11/02/belkins-grip-360-stand-case-for-the-apple-ipad-provides-every-viewing-angle-you-could-wish-for/.*

(Continued)

*Primary Examiner* — Dmitry Suhol
*Assistant Examiner* — Jason Yen
(74) *Attorney, Agent, or Firm* — Hall Estill Attorneys at Law; Daniel P. Dooley

(57) ABSTRACT

An apparatus generally directed to controlling a video game. The apparatus preferably includes a tablet computer, an electronic game communicating with the tablet computer, and an input device for controlling movement of a virtual object provided by the electronic game. Preferably, the input device includes a pair of opposing side structures adjacent opposing sides of plurality of sides of the tablet computer. The input device further preferably includes a plurality of input switches, wherein said input switches are adjacent each of the at least two opposing sides of the plurality of sides of the tablet computer, and a bridge structure disposed between the pair of sides to form a three sided structure. The third structure mitigates inadvertent removal of the tablet computer from the three sided structure when the tablet computer is fully nested within the three sided structure.

20 Claims, 7 Drawing Sheets

(51) Int. Cl.
   *A63F 13/20*  (2014.01)
   *G06F 1/16*  (2006.01)
   *A63F 13/90*  (2014.01)

(56) References Cited

U.S. PATENT DOCUMENTS

| | | | |
|---|---|---|---|
| 6,710,764 | B1 | 3/2004 | Burgel et al. |
| 7,733,637 | B1 | 6/2010 | Lam |
| 7,818,668 | B2 | 10/2010 | Michelstein et al. |
| 7,942,745 | B2 | 5/2011 | Ikeda et al. |
| 8,100,769 | B2 | 1/2012 | Rabin |
| 8,100,770 | B2 | 1/2012 | Yamazaki et al. |
| 8,180,295 | B2 | 5/2012 | Mao |
| 2002/0155890 | A1* | 10/2002 | Ha et al. ............ 463/36 |
| 2006/0291156 | A1 | 12/2006 | Allen |
| 2009/0209288 | A1 | 8/2009 | Rofougaran |
| 2009/0291760 | A1 | 11/2009 | Hepburn et al. |
| 2010/0069160 | A1* | 3/2010 | Barrett et al. .......... 463/46 |
| 2010/0081505 | A1* | 4/2010 | Alten et al. ........... 463/36 |
| 2010/0250815 | A1* | 9/2010 | Street et al. .......... 710/303 |
| 2011/0260969 | A1 | 10/2011 | Workman |
| 2012/0026118 | A1 | 2/2012 | Hackborn |
| 2012/0236485 | A1* | 9/2012 | Staats et al. ........ 361/679.12 |

OTHER PUBLICATIONS

Incase, iPad Has Arrived and Incase Has You Covered, Apr. 12, 2010, http://web.archive.org/web/20100406085604/http://goincase.com/blog/2010/04/03/ipad-has-arrived-and-incase-has-you-covered/.*
Wesley Fenlon, This iPhone Add on Makes It Easy to Control Your Games, Feb. 9, 2011, http://www.businessinsider.com/this-iphone-add-on-makes-it-easy-to-control-your-games-2011-2#ixzz2QuV5M4vW.*
Alex Nevsky, ZeroChroma Takes a Firm Stand With Vario-SC Case for iPad 2, Oct. 31, 2011, http://www.tablet2cases.com/news/2011/10/zerochroma-takes-a-firm-stand-with-vario-sc-case-for-ipad-2/.*
Chartier; "Preorders begin for iPhone, iPod touch game controller." Published Feb. 8, 2011; In Macworld website (online); http://www.macworld.com/article/1157741/icontrolpad.html; entire document especially p. 1.
Wattanajantra; "iControlPad unofficial iPhone gamepad coming soon." In c/net UK website (online); Published Aug. 27, 2010; http://crave.cnet.co.uk/mobiles/icontrolpad-unofficial-iphone-gamepad-coming-soon-50000514; entire document, especially pp. 3, 4.
PCT International Search Report; mailed May 21, 2013; PCT International Application No. PCT/US13/31157.

* cited by examiner

TABLET COMPUTER WITH GRIP RAIL AND GAME CONTROLLER

RELATED APPLICATIONS

This application is a continuation application of U.S. patent application Ser. No. 13/494,801 filed Jun. 12, 2012, entitled "Game Controller," which in turn claims priority to U.S. Provisional Application Ser. No. 61/577,709 filed on Dec. 20, 2011, entitled "Game Controller."

SUMMARY

In a preferred embodiment an apparatus includes a tablet computer, the tablet computer preferably providing a plurality of sides, each of the plurality of sides are disposed between an electronic display screen and a back of the tablet computer, and an electronic game communicating with the tablet computer. The electronic game preferably provides an object displayed on the electronic display screen of the tablet computer, and movement of the object is controlled by an input device.

In a preferred embodiment, the input device includes at least a pair of side structures, one of the pair of side structures is adjacent to and confines the tablet computer on a first side of the plurality of sides of the tablet computer, the second side structure of the pair of side structures is adjacent to and confines the tablet computer on a second side of the plurality of sides of the tablet computer, wherein the first and second sides of the plurality of sides of the tablet computer are opposing sides of the plurality of sides of the tablet computer. The input device further preferably includes a plurality of input switches, wherein the input switches are adjacent each of the at least two opposing sides of the plurality of sides of the tablet computer, and a bridge structure disposed between the pair of side structures and adjacent a third side of the plurality of sides of the tablet computer. The bridge structure in combination with the pair of side structures form a three sided structure in which the tablet computer nests such that the tablet computer is confined by the three sided structure, and the three sided structure mitigates inadvertent removal of the tablet computer from the three sided structure when the tablet computer is fully nested within the three sided structure.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

DETAILED DESCRIPTION

The present disclosure generally relates to an apparatus directed to controlling electronic games, also referred to herein as video games, or computer games. The apparatus preferably includes a tablet computer, an electronic game communicating with the tablet computer, and an input device for controlling movement of a virtual object provided by the electronic game. Preferably, the input device includes a pair of opposing side structures adjacent opposing sides of plurality of sides of the tablet computer. The input device further preferably includes a plurality of input switches, wherein said input switches are adjacent each of the at least two opposing sides of the plurality of sides of the tablet computer, and a bridge structure disposed between the pair of sides to form a three sided structure. The third structure mitigates inadvertent removal of the tablet computer from the three sided structure when the tablet computer is fully nested within the three sided structure.

Figure 1:
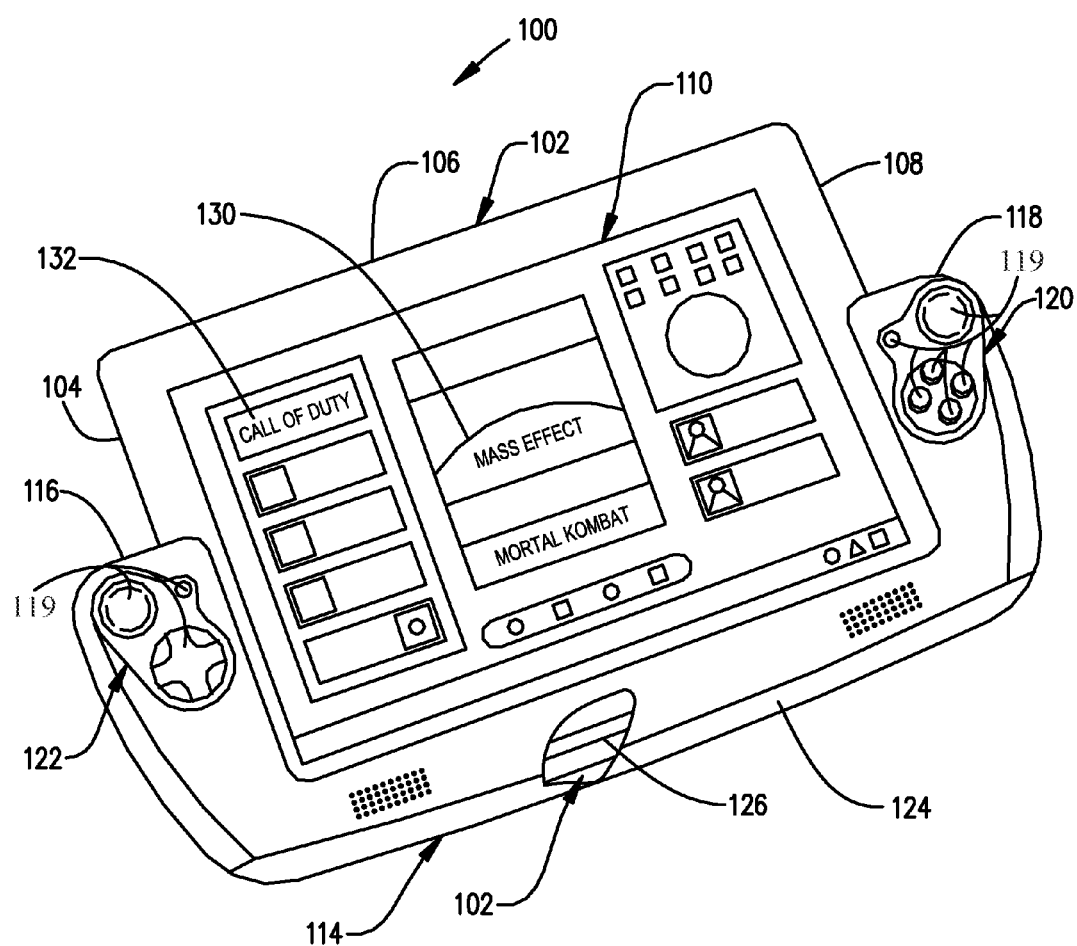
FIG. 1 is a front perspective view, with partial cutaway, of an embodiment of an electronic game control apparatus constructed and operated in accordance with various embodiments disclosed and claimed herein.

Turning to the drawings, FIG. 1 provides an exemplary game controller 100 capable of being used in accordance with various embodiments of the present invention. The exemplary game controller 100 has at least a tablet computer 102 that providing a plurality of sides, such as 104, 106, 108, and 126. Each of the plurality of sides 104, 106, and 108 are disposed between an electronic display screen 110 (also referred herein to as a touch screen 110, for use in interacting with the applications provided by the tablet computer 102), of the tablet computer 102, and a back 112 (shown by FIG. 2) of the tablet computer 102. The exemplary game controller 100 further preferably includes an input device 114.

In a preferred embodiment, the input device 114 provides a pair of side structures, 116 and 118. One of the pair of side structures, for example 116, is adjacent to and confines the tablet computer 102 on a first side, such as 104 of the plurality of sides 104, 106, 108, and 126 of the tablet computer 102. The second side structure of the pair of side structures, such as 118, is adjacent to and confines the tablet computer 102 on a second side, such as 108, of the plurality of sides 104, 106, 108, and 126 of the tablet computer 102, wherein the first and second sides, such as 104 and 108, of the plurality of sides 104, 106, 108, and 126 of the tablet computer 102 are opposing sides of the plurality of sides 104, 106, 108, and 126, of the tablet computer 102.

In a preferred embodiment, the input device 114 further provides a plurality of input switches 120 and 122, wherein the input switches 120 and 122 are adjacent each of the at least two opposing sides 104 and 108, of the plurality of sides 104, 106, 108, and 126, of the tablet computer 102, and a bridge structure 124, disposed between the pair of side structures 116 and 118 and adjacent the third side 126, of the plurality of sides 104, 106, 108, and 126, of the tablet computer 102. The bridge structure 124 in combination with the pair of side structures 116 and 118 form a three sided structure 128 (of FIG. 5) (also referred to herein as a u-shaped structure 128 of the input device 114), in which the tablet computer 102 nests, such that the tablet computer 102 is confined by the u-shaped structure 128, and the u-shaped structure 128 mitigates inadvertent removal of the tablet computer 102 from the u-shaped structure 128 when the tablet computer 102 is fully nested within the three sided structure 128. Preferably, the bridge structure 124 conceals not more than one third (⅓) of the back 112, of the computing device 102.

The exemplary game controller 100 of FIG. 1, further preferably includes a video game 130. Preferably, the video game 130 provides a virtual object 132 displayed by the electronic display screen 110, the virtual object 132 is responsive to input from the input device 114. An example of a response of the virtual object 132 would be movement of the virtual object 132, or the loading of an alternate computer game, based on a predetermined signal provided by the input device 114, or an appearance of a character. It is noted that FIG. 1 displays the housings 119 of the plurality of switches 120, whereas at least some of the plurality of switches are shown in the partial cutaway of FIG. 3, and whereupon a manual intervention of a housing 119 of a selected switch of the plurality of switches 120, the selected switch produces a predetermined signal that is provided by the selected switch to the tablet computer 102.

Figure 2:
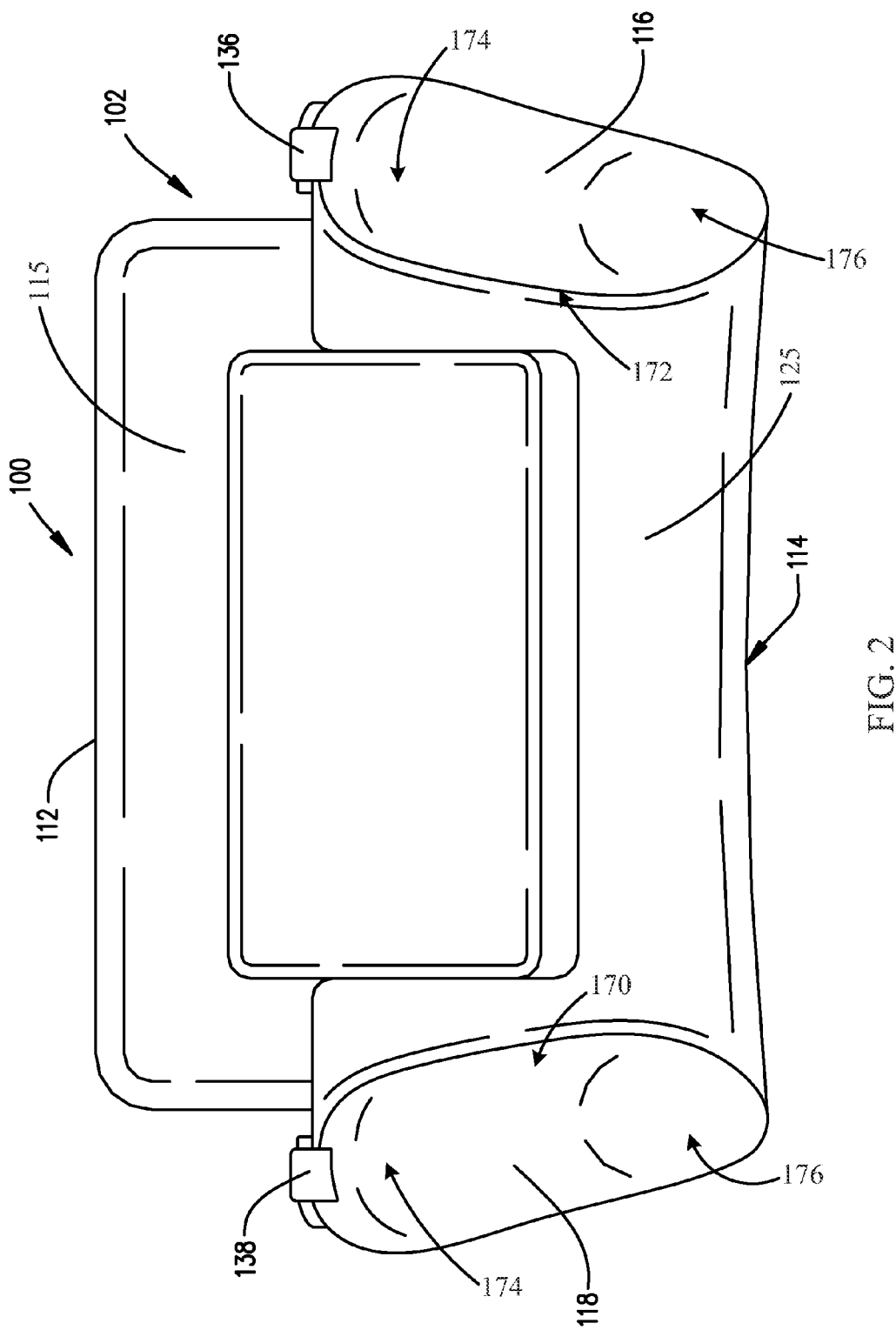
FIG. 2 shows a back plan view of the apparatus of FIG. 1.

FIG. 2 depicts the exemplary game controller 100, and reveals the back 112 of the tablet computer 102. Further shown by FIG. 2, is the input device 114, which provides a pair of trigger switches 136 and 138, supported by their corresponding side structures 116 and 118 respectively, and grip rail 115, integrated into the back 112, The grip rail 115 accommodates a user's hand, and in particular a user's thumb, to stabilize the tablet computer 102, when interacting with the tablet computer 102 without use of the input device 114. In addition, FIG. 2 shows the bridge structure 124, of the input device 114, provides structural support for a grasp feature 125. The grasp feature 125 interacts with the grip rail 115, to enhance the user's ability to stabilize the tablet computer when accessing the tablet computer 102 through the touch screen 110, of FIG. 1. As further shown by FIG. 4, the grip rail 115 is a single continuous contoured projection extending from the back 112 of the tablet computer 102, rather than a separate structural component added to the tablet computer 102, or back 112 thereof.

Figure 3:
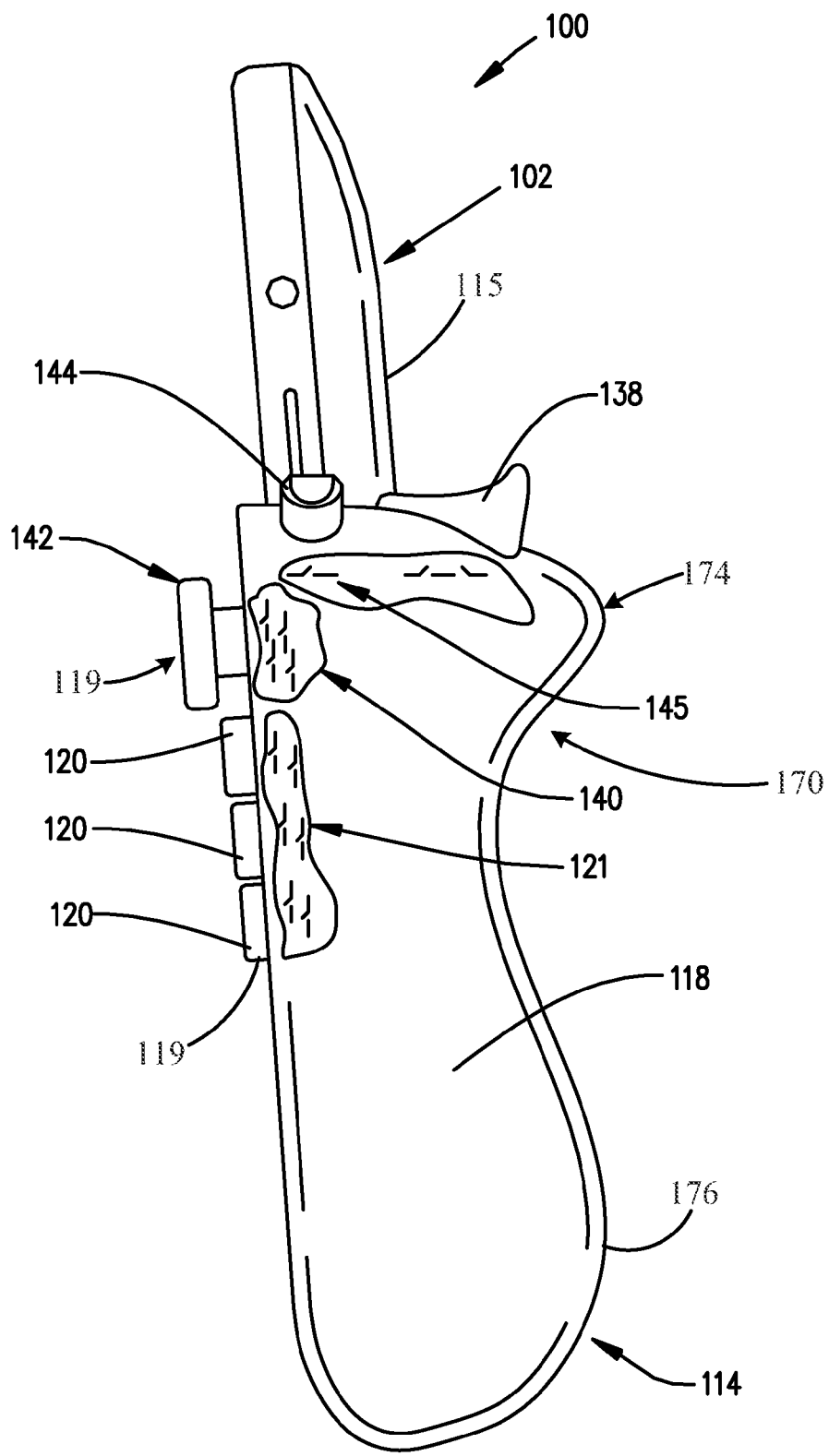
FIG. 3 displays a right side plan view, with partial cutaway, of the apparatus of FIG. 1, constructed in accordance with various embodiments disclosed and claimed herein.

Turning to FIG. 3, there shown is a predetermined number of the plurality of switches 140, collaborate with each other to form an input apparatus 142, the input apparatus 142 controls display of virtual objects displayed on the electronic display screen 110 of the tablet computer 102. Preferably, the input apparatus 142 is a joystick 142. FIG. 3 further shows that the input device 114 provides a plurality of buttons 144 and 120 which activate corresponding switches 145 and 121. The main function of the trigger 138, the joystick 142, and the buttons 144 and 120 is to govern the movement/actions of a playable body/object or otherwise influence events in a video game 130 (of FIG. 1) or an alternate computer game. FIG. 3 further shows the contour and projection of the grip rail 115 extending from the back 112, of the tablet computer 102.

Figure 4:
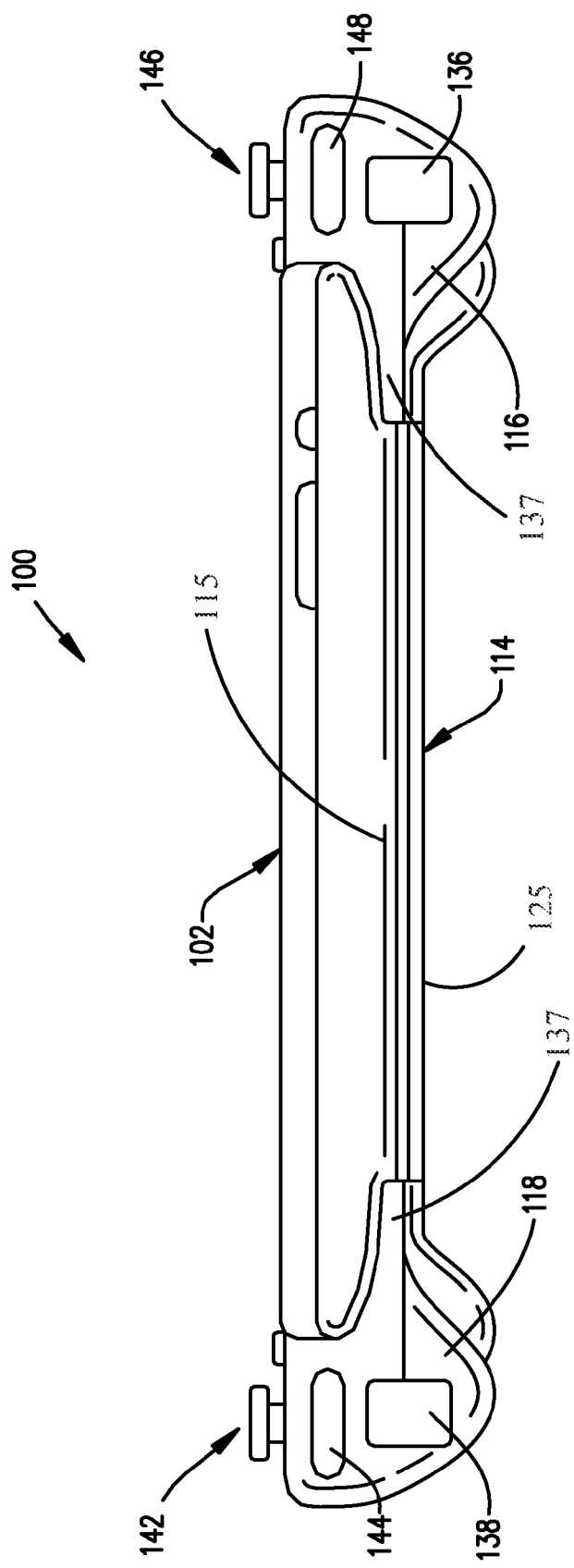
FIG. 4 depicts a right side plan view of the apparatus of FIG. 1, constructed in accordance with various embodiments disclosed and claimed herein.
Figure 5:
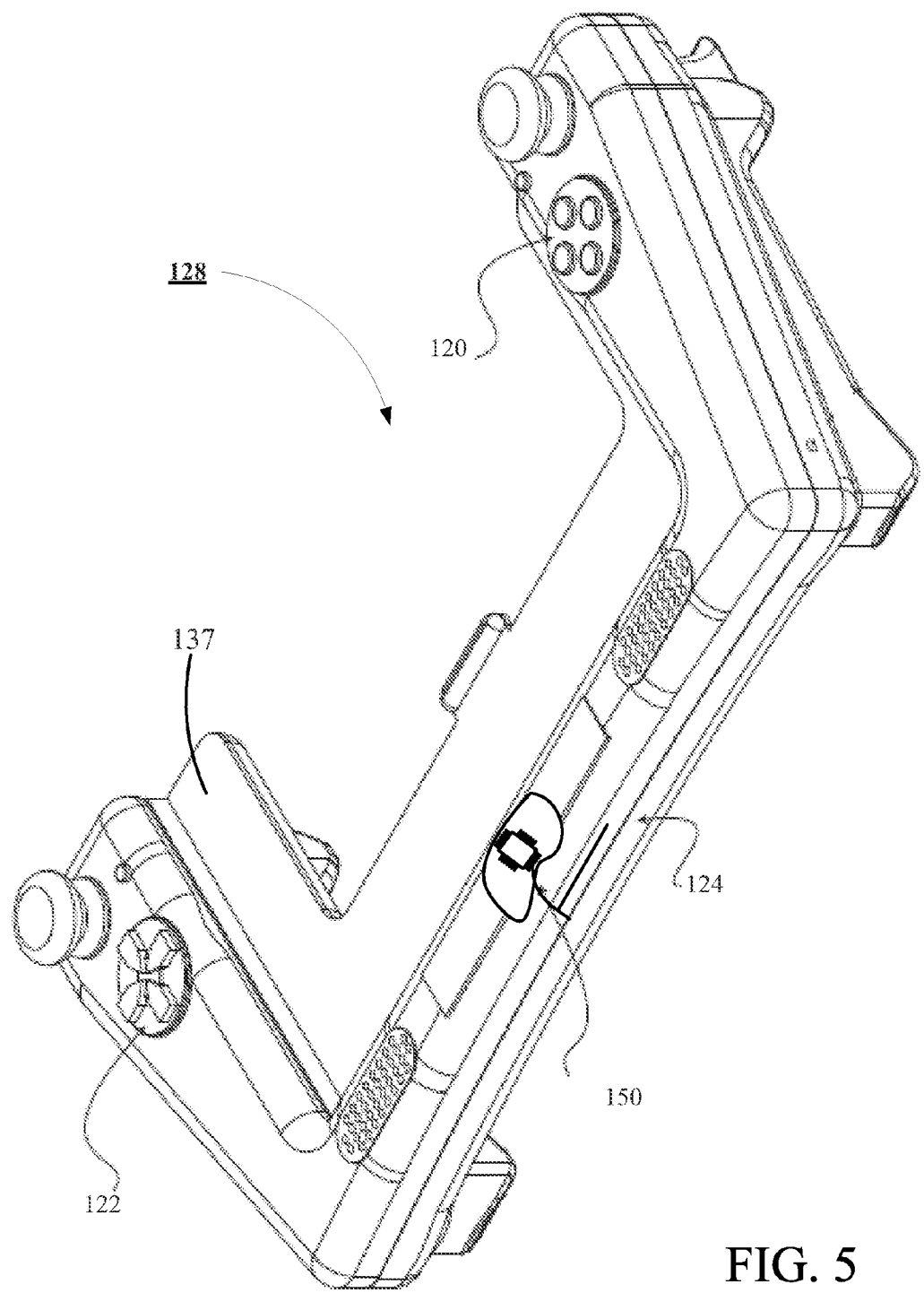
FIG. 5 illustrates a top perspective view of an embodiment of an input device of FIG. 1, constructed in accordance with various embodiments disclosed and claimed herein.

FIG. 4 shows the interaction of the grip rail 115 and the grasp feature 125, which enhances the user's ability to stabilize the tablet computer 102 when operating the tablet computer 102 through the touch screen 110. FIG. 4 further shows that the exemplary game controller 100, further includes a second joystick 146, and a second button 148, which are provided on the side structure 116, adjacent the trigger switch 136, and a support flange 137, in contact adjacency with the back of the tablet computer 102. While FIG. 5 shows the central processing unit (CPU) 150, of the input device 114, and a more revealing view of the support flange 137.

Figure 6:
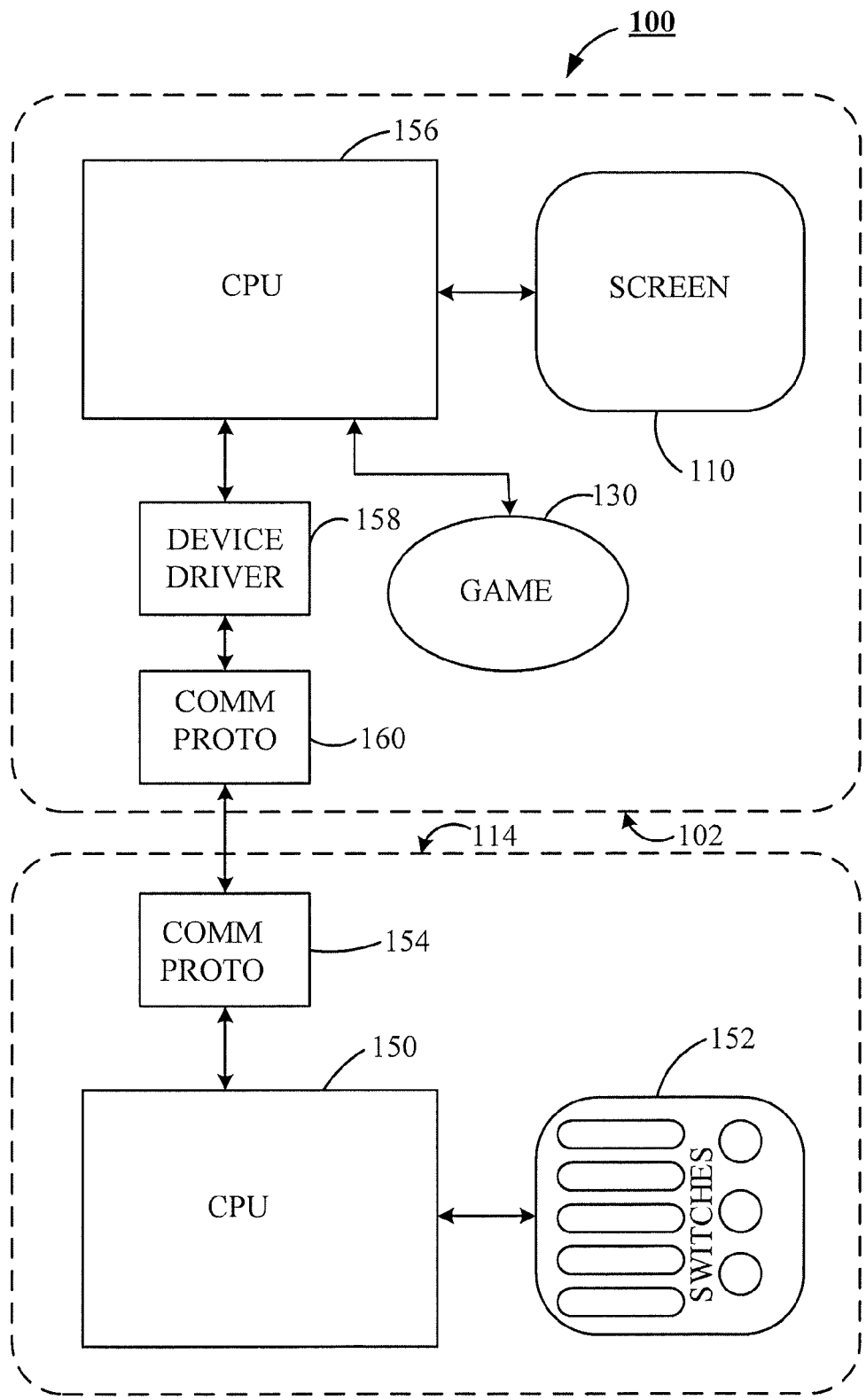
FIG. 6 is a block diagram of an embodiment of the apparatus of FIG. 1.

FIG. 6 shows the input device 114 includes the CPU 150, interacting with the plurality of switches 152, which preferably include at least switches 120, 122, 136, 138, 142, 144, 146, and 148. FIG. 6 further shows the input device 114 further includes a communications protocol 154 providing the communication link between the tablet computer 102, and the input device 114. In a preferred embodiment, a Universal Serial Bus (USB) communications protocol is utilized. However, as those skilled in the art will recognize, the communications protocol 154 is not limited to a USB protocol.

FIG. 6 further shows that the tablet computer 102 preferably includes at least a CPU 156, interacting with the electronic display screen 110, the video game 130, a device driver 158, which facilitates the interaction between the tablet computer 102 and the input device 114, and a communications protocol 160 providing the communication link between the tablet computer 102, and the input device 114. In a preferred embodiment, a Universal Serial Bus (USB) communications protocol is utilized. However, as those skilled in the art will recognize, the communications protocol 160 is not limited to a USB protocol.

Figure 7:
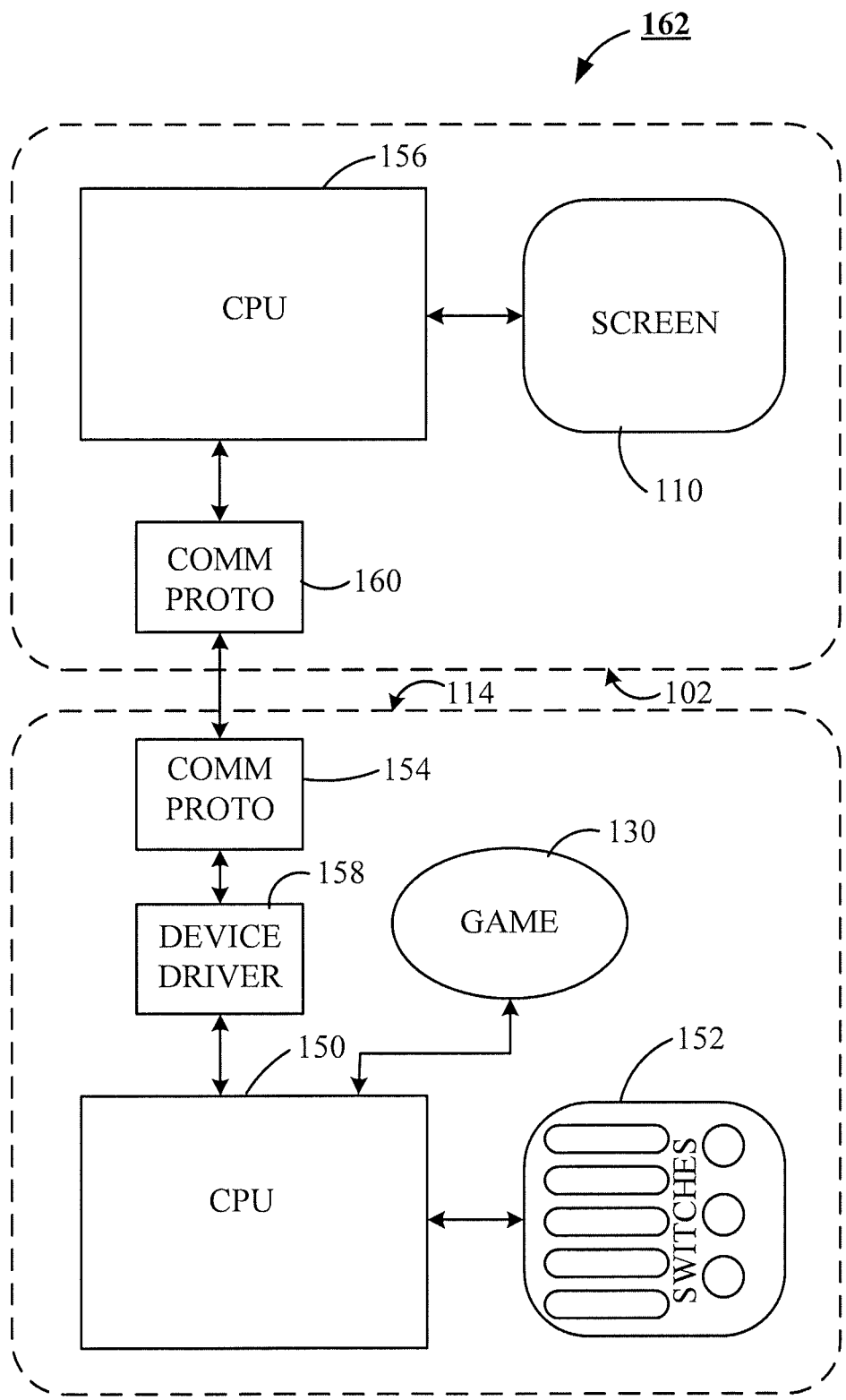
FIG. 7 is a block diagram of an alternate embodiment of the apparatus of FIG. 1.

FIG. 7 shows an alternative embodiment of an exemplary game controller 162, in which the device driver 158 and the video game 130 are located in the input device 114.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular tablet computer without departing from the spirit and scope of the present invention.

What is claimed is:

1. A device comprising:
    a computing device, the computing device providing a plurality of sides, each of the plurality of sides are disposed between an electronic display screen of the computing device and a back of the computing device, wherein the back of the computing device provides a grip rail, the grip rail is a single continuous contoured projection extending from the back of the computing device, and in which the grip rail is a structural feature of the back of the computing device rather than a separate structural component added to the computing device; and
    an input device in electronic communication with the computing device, the input device providing side structures and a bridge portion disposed between the side structures, the side structures adjacent to and confining the computing device on at least two opposing sides but not more than three sides of the plurality of sides of the computing device, wherein the bridge portion conceals not more than one third of the back of the computing device.

2. The device of claim 1, further comprising:
    a device driver communicating with each the input device and the computing device.

3. The device of claim 2, in which the input device further comprises a bridge structure disposed between the side structures and adjacent a third side of the plurality of sides of the computing device, the bridge structure in combination with the side structures form a three sided structure in which the computing device nests, such that the computing device is confined by the three sided structure, and the three sided structure mitigates inadvertent removal of the computing device from the three sided structure when the computing device is fully nested within the three sided structure, and wherein the bridge structure provides structural support for the grasp feature.

4. The device of claim 3, in which a predetermined number of the plurality of switches collaborate with each other to form an input apparatus, the input apparatus controls display of virtual objects displayed on the electronic display screen of the computing device.

5. The device of claim 1, in which the device driver resides on the computing device.

6. The device of claim 1, in which the device driver resides on the input device.

7. The device of claim 1, in which the input device communicates with the computing device by way of a communications protocol.

8. The device of claim 2, in which a select switch, of the plurality of switches, provides a housing, wherein upon a manual intervention of the housing of the selected switch, the switch produces a predetermined signal provided to the computing device.

9. The device of claim 8, further comprising a video game, the video game provides a virtual object displayed by the electronic display screen, the virtual object responsive to input from the input device.

10. The device of claim 9, further comprising a computer game, the computer game provides an object displayed by the electronic display screen, the object responsive to input from the input device, and in which a backside of the input device provides a grasp feature interacting with the grip rail, the grasp feature enhancing a user's ability to stabilize the computing device.

11. The device of claim 10, in which the each side structure of the input device is configured to fit comfortably in a hand of a user, and, in which the input device further comprises a bridge structure disposed between the side structures and adjacent a third side of the plurality of sides of the computing device, the bridge structure in combination with the side structures form a three sided structure in which the computing device nests, such that the computing device is confined by the three sided structure, and the three sided structure mitigates inadvertent removal of the computing device from the three sided structure when the computing device is fully nested within the three sided structure, and wherein the bridge structure provides structural support for the grasp feature.

12. An apparatus comprising:
 a computing device, the computing device providing a plurality of sides, each of the plurality of sides are disposed between an electronic display screen of the computing device and a back of the computing device;
 an input device in electronic communication with the computing device, the input device providing side structures and a bridge portion disposed between the side structures, the side structures adjacent to and confining the computing device on at least two opposing sides but not more than three sides of the plurality of sides of the computing device, wherein the bridge portion conceals not more thean one third of the back of the computing device
 an electronic game communicating with the computing device, the electronic game providing an object displayed on the electronic display screen of the computing device; and
 means for controlling a movement of the object displayed on the electronic display screen of the computing device, wherein the back of the computing device provides a grip rail, the grip rail is a single continuous contoured projection extending from the back of the computing device, and in which the grip rail is a structural feature of the back of the computing device rather than a separate structural component added to the computing device.

13. The apparatus of claim 12, in which the means for controlling the movement of the object displayed on the electronic display screen is provided by an input device, the input device comprises:
 a plurality of input switches, wherein said input switches are adjacent each of the at least two opposing sides of the plurality of sides of the computing device; and
 the bridge structure disposed between the pair of side structures and adjacent a third side of the plurality of sides of the computing device, the bridge structure in combination with the pair of side structures form a three sided structure in which the computing device nests such that the computing device is confined by the three sided structure, and the three sided structure mitigates inadvertent removal of the computing device from the three sided structure when the computing device is fully nested within the three sided structure, and wherein the bridge structure provides structural support for the grasp feature.

14. The apparatus of claim 13, further comprises:
 a first input/output connector provided by the computing device;
 a second input/output connector provided by the input device; and
 a communications protocol, the communications protocol provides structured communication between the computing device and the input device when the first and second input/output connectors are connected together.

15. The apparatus of claim 14, in which the communications protocol is a universal serial bus, and the first and second input/output connectors are universal serial bus connectors.

16. The apparatus of claim 15, in which the three sided structure forms a u-shaped structure.

17. The apparatus of claim 16, in which the u-shared structure provides support flanges protruding from an underside of the u-shared structure and in contact adjacency with the back of the computing device, the support flange supporting the grasp feature.

18. The apparatus of claim 16, in which a predetermined number of the plurality of switches collaborate with each other to form an input device, the input device controls movement of the object of the video game displayed on the electronic display screen of the computing device.

19. The apparatus of claim 18, in which the input device is selected from a group consisting of a trigger, a joystick, and a button.

20. The apparatus of claim 19, further comprises a device driver communicating with each the input device and the computing device.

* * * * *